Oct. 22, 1957

C. S. WEYANDT 2,810,871

RECTIFIER ASSEMBLIES

Filed Oct. 28, 1955

INVENTOR.
CARL S. WEYANDT
BY
William D. Carothers

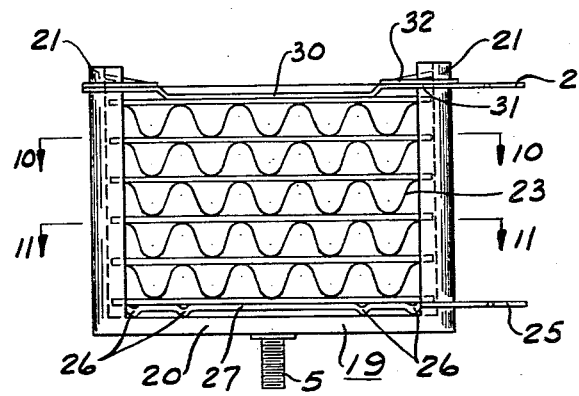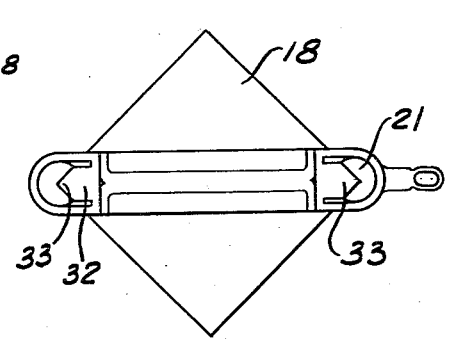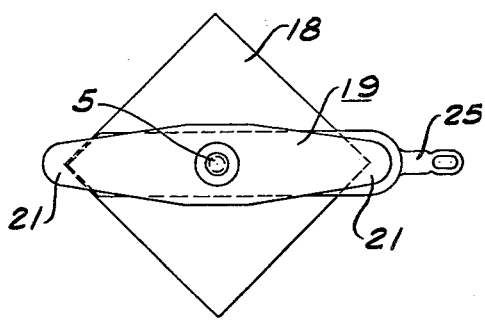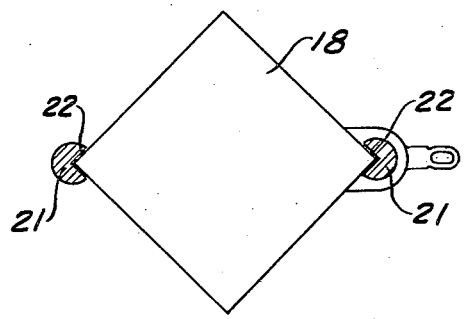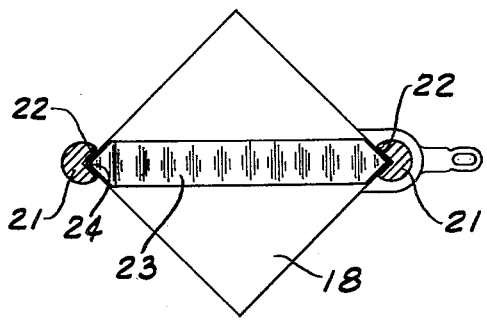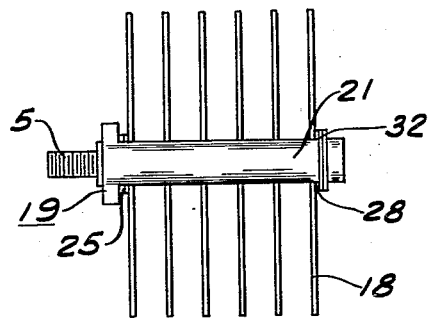

United States Patent Office 2,810,871
Patented Oct. 22, 1957

2,810,871

RECTIFIER ASSEMBLIES

Carl S. Weyandt, Indiana, Pa.

Application October 28, 1955, Serial No. 543,302

5 Claims. (Cl. 317—234)

This invention relates generally to rectifier assemblies and more particularly to the configuration shape and structure of the elements making up a rectifier stack.

Rectifier disks have been made in the form of circular disks with holes in the center and square disks with a hole in the center, and also in the form of square disks with arcuate or square notches in the opposed edges thereof for receiving assembly posts. Every time that a rectifier is handled and is subjected to a punching action for forming the hole in the center or in the edges, the rectifying material is ruptured and sometimes causes blemishes which is the principal source of rejects in the rectifier cells before they are assembled or sometimes these blemishes do not show up until after the stack is formed, which of course causes the whole stack to be scrapped. Again the holes in the center and the notches in the sides of the receiver plates reduce the area which can be employed for rectification.

The principal object of this invention is to provide a rectifier plate, the edges or center portion of which is imperforated, permitting the whole of the plate to be available for rectification and to avoid operations on the rectifier plate that would cause the same to form blemishes which would interfere with the operation of the rectifier.

Another object of this invention is the provision of a form of a clip which engages an insulating post for the purpose of applying pressure to and for holding the rectifier stack in assembled relation.

Another object is the provision of the insulated posts assembly which would employ the natural configuration of the rectifier plates in holding them in assembled relation. This is performed by putting grooves in the opposed faces of the insulating posts to receive the corners or the opposed sides of the great diameter of a circular disk. These being the natural shapes the rectifier disks do not require the additional operation in perforating or notching plates and thus thereby avoid blemishes in the rectifier itself and increase the production.

Other objects and advantages appear hereinafter in the following description and claims.

The accompanying drawings show for the purpose of exemplification, without limiting the invention or claims thereto, certain practical embodiments illustrating the principles of this invention wherein:

Fig. 7 is a view in side elevation showing the modified form of this invention.

Fig. 8 is a top plan view of Fig. 7.

Fig. 9 is a bottom plan view of Fig. 7.

Fig. 10 is a sectional view taken along the line 10—10 of Fig. 7.

Fig. 11 is a sectional view taken along the line 11—11 of Fig. 7.

Fig. 12 is an end elevation of the structure shown in Fig. 7.

Figure 1:
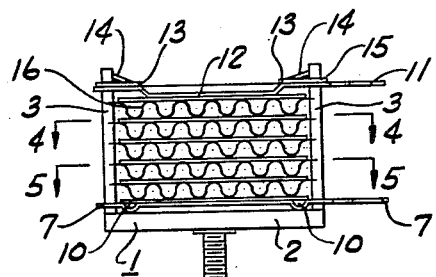
Fig. 1 is a view in elevation of the rectifier assembly comprising this invention.
Figure 2:
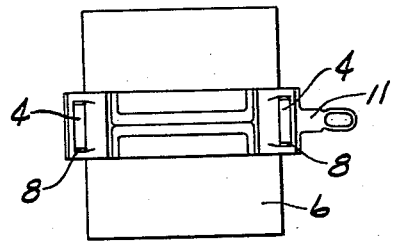
Fig. 2 is a top plan view of Fig. 1.
Figure 3:
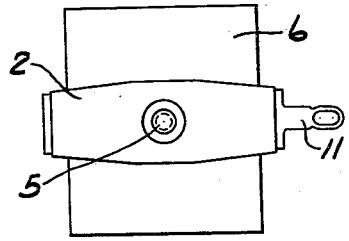
Fig. 3 is a bottom plan view of Fig. 1.

Referring to Figs. 1 to 6 the rectifier stack is formed on the U-shaped insulating bracket 1 which comprises the base member 2 and the insulated posts 3. The insulated posts in this instance are rectangular in cross section, as indicated at 4 in Fig. 2. The insulating posts being formed integral with the base form a U-shaped assembly member. A mounting screw 5 is placed on the under side of the base 2 for the purpose of mounting the rectifier stack. This mounting post is not in any way connected with the electrical circuit of the rectifier.

Figure 4:
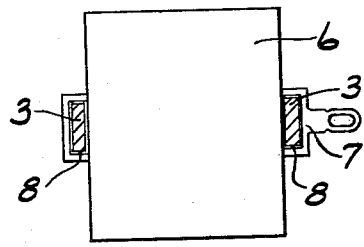
Fig. 4 is a sectional view taken on the line 4—4 of Fig. 1.

The rectifier stack comprises the series of plates 6 which are rectangular in shape and are provided with a rectifying element, such as selenium or other similar rectifying material. These plates are stacked as shown in Fig. 1, six in number, between the insulating posts 3. As illustrated in Fig. 4 there are no notches on the plate. The plate is in rectangular form and its edges are free not only from the insulating posts 3 but from everything else when placed in the stack as illustrated in Fig. 1.

The bottom of the stack is provided with the conducting strip 7. This conducting strip has slots 8 at each end thereof to slide over the posts 3. The conducting strip 7 is provided with two small ridges 10 at opposite ends to form the bridging section which is in spaced relation with the base. This bridging section which is in spaced relation with the base. This bridging section functions to produce a resilient action in the conducting strip itself in that there is no supporting member intermediate of the abutments 10.

The conducting strip 11 at the opposite end of the stack is likewise provided with the openings 8 to receive the post 3. However the intermediate portion of the conducting strip 11 is somewhat different than that of the conducting strip 7 in that its central portion is bent downwardly and inwardly as indicated at 12 to engage the first of the plates 6. Thus the ends of the conducting strip 11 form a spring backing for the clips 13 which are provided with an aperture to receive the post 3 and are also provided with a tongue 14 which if flattened would close the opening 15 to receive the insulating post 3 materially close and therefore functions as a clamping device, preventing the removal of the clip from the post once it has been set.

Figure 5:
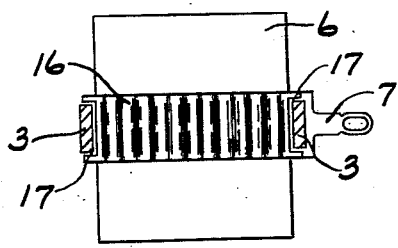
Fig. 5 is a sectional view taken along the line 5—5 of Fig. 1.
Figure 6:
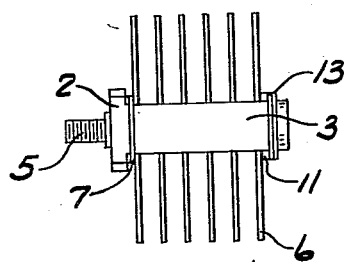
Fig. 6 is a view in end elevation of the structure shown in Fig. 1.

Each of the plates 6 when mounted in stacked relation are divided by the spring pressure spacing element 16. These spring spacer elements are in the form of rectangular sheets which are corrugated to provide pressure contacting surfaces between adjacent selenium rectifier plates. Each of the plates 16 has a notch at the end thereof, indicated at 17, for the purpose of forming a bifurcation that straddles the insulating posts 3 and maintains their position. As illustrated in Fig. 1, each pressure element is provided with eleven corrugations, five of which engage one plate and six engage the opposite plate. These engagements not only carry the current in the stack but also dissipate any heat that has developed within the rectifier during its operation. However, the rectifier plate in general is exposed as illustrated in Fig. 5 so that the heat may be readily dissipated therefrom.

After the rectifier has been stacked and the clips 13 have been placed on the posts the same is dipped in the paint which aids in retaining the position of the rectifiers and also helps to prevent them from becoming disassembled.

With this structural arrangement the rectifier need not be punched, perforated or notched in any manner, and thus the blemishes are materially reduced in the production, thereby increasing the efficiency of manufacturing the rectifier stacks and also increasing the quality of the stack owing to the fact that it had no cutting operations other than the forming of the plate itself to interfere with its operation.

In the structure as shown in Figs. 7 to 12 the rectifier plate 18 is square in shape and the insulating U-shaped bracket 19 with its base 20 and mounting post 5 is provided with parallel round insulating posts 21. These posts are provided with notches 22, as shown in Figs. 10 and 11, which oppose each other, and these notches take the form of a right angle to receive the opposite corners of the rectifier plate 18. Each of the corrugated spacer strips 23 is also provided with pointed ends, as illustrated at 24 in Fig. 11. A bottom terminal or conductor 25 is likewise provided with a slot in the shape of the insulating post so that it may be slide thereover. This terminal is provided with two abutments 26 at each end thereof which form the bridging section 27 intermediate thereof and provide for a resilient backing of the rectifier stack.

The upper terminal 28 is provided with similar openings to fit over the post and is also provided with a depending section, such as indicated at 30, which forms the resilient bridging sections 31, at each end of the terminal member 28, which in turn back up the clips 32, which are provided with a cross-sectional opening to receive the posts 21 and are provided with tongue 33 that engages in the groove 22 of the post 21 and thereby locks the stack in position.

Here again the rectifier plate itself is not perforated or notched or otherwise cut for receiving any assembly elements and each of the elements employed in assembling the rectifier stack is substantially the same in both sets, the only difference being in the use of the right angle grooves cut in the post of the second group, which aid in maintaining alignment between the rectifier plates. These plates may be of any size or shape. The angles may be formed from a hexagonal washer or the plates may be circular in cross section, as shown in the prior art, in which case the notches 22 in the insulating post will be arcuate.

The important factor of this invention over the prior art is the fact that the rectifier cells have no cutouts whatsoever. Having no holes in the center or cutouts on the edge, they provide the full area for operating as a rectifying unit. Again the act of making cutouts either in the edges or in the center of the plate endangers the structure of the selenium cell, creating sure hazards, making them unsuitable for use. Thus by employing plates of standard uniform size the production is increased by not having considerable waste owing to punching operations for the holes in the sides or center of the disk.

Another important factor of this invention resides in the fact that a rectifier of this type can be assembled by automatic means there being no bolts or nuts or insulating washers. The stack can be formed by mechanically sliding the terminals, rectifier cells, and spacers in their proper order on the bracket and lastly the locking clips 13 which hold the assembly on the bracket. The assembly is then dipped in paint which prevents any movement of the parts and avoids interruption of the contacting surfaces.

I claim:

1. A rectifier comprising a plurality of imperforated rectifier plates assembled to form a rectifier stack, two spaced insulated posts supporting the assembled rectifier stack at two diametrically opposite portions of said plates, stack clamping means including a clip having a hole formed with a tongue extending into the hole, the hole being large enough to slip over the end of a post and cause the tongue to flex and engage the post to retain said rectifier stack under pressure.

2. The structure of claim 6 which also includes a conducting strip at each end of the stack in contact with at least a portion of the surface of the corresponding end rectifier plate, said conducting strip adjacent said clip is formed with an overhanging section that functions as an additional spring when in engagement with said clip to aid in locking the stack in assembled relation.

3. The structure of claim 6 which also includes a conducting strip at each end of the stack in contact with at least a portion of the surface of the corresponding end rectifier plate, one of said conducting strips has abutments adjacent the ends thereof to form a resilient bridge therebetween to backup said rectifier stack.

4. The structure of claim 6 which also includes a conducting strip at each end of the stack in contact with at least a portion of the surface of the corresponding end rectifier plate, one of said conducting strips has an intermediate abutment providing a cantilever end which forms a resilient backup for the clip holding the rectifier stack in assembled relation.

5. A rectifier comprising a plurality of imperforated rectifier plates assembled to form a rectifier stack, two spaced insulated posts supporting the assembled rectifier stack at two diametrically opposite portions of said rectifier plates, stack clamping means engaging said posts to retain said rectifier stack under pressure, said rectifier plates having at least two oppositely disposed angular corners and the inner face of said posts having continuous spaced abutment means to receive the opposite side edges of two oppositely disposed plate corners when the elements are stacked therebetween and prevent them from becoming misaligned.

References Cited in the file of this patent

UNITED STATES PATENTS 2,720,616     Vanderhoof             Oct. 11, 1955